United States Patent
Kelleher et al.

(10) Patent No.: US 9,529,712 B2
(45) Date of Patent: Dec. 27, 2016

(54) TECHNIQUES FOR BALANCING ACCESSES TO MEMORY HAVING DIFFERENT MEMORY TYPES

(75) Inventors: Brian Kelleher, Palo Alto, CA (US); Emmett M. Kilgariff, San Jose, CA (US); Wayne Yamamoto, Saratoga, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 1126 days.

(21) Appl. No.: 13/191,438

(22) Filed: Jul. 26, 2011

(65) Prior Publication Data

US 2013/0031328 A1    Jan. 31, 2013

(51) Int. Cl.
G06F 12/08    (2006.01)
G06F 12/02    (2006.01)
G06F 12/06    (2006.01)
G06F 13/16    (2006.01)

(52) U.S. Cl.
CPC .......... G06F 12/0292 (2013.01); G06F 12/06 (2013.01); G06F 12/0607 (2013.01); G06F 13/1694 (2013.01); G06F 12/08 (2013.01); G06F 2212/205 (2013.01); Y02B 60/1225 (2013.01); Y02B 60/1228 (2013.01)

(58) Field of Classification Search
CPC ...... G06F 3/067; G06F 3/0683; G06F 3/0685; G06F 3/0688–3/0689; G06F 12/0607; G06F 12/0215; G06F 13/1684
USPC .......................................................... 711/202
See application file for complete search history.

(56) References Cited

U.S. PATENT DOCUMENTS

| | | |
|---|---|---|
| 5,553,023 A | 9/1996 | Lau et al. |
| 5,594,854 A | 1/1997 | Baldwin et al. |
| 5,623,692 A | 4/1997 | Priem et al. |
| 5,664,162 A | 9/1997 | Dye |
| 5,701,438 A * | 12/1997 | Bains ............................ 711/211 |
| 5,854,631 A | 12/1998 | Akeley et al. |
| 5,854,637 A | 12/1998 | Sturges |
| 5,953,215 A | 9/1999 | Karabatsos |
| 6,032,224 A * | 2/2000 | Blumenau .................... 711/117 |
| 6,072,500 A | 6/2000 | Foran et al. |
| 6,104,417 A | 8/2000 | Nielsen et al. |
| 6,115,049 A | 9/2000 | Winner et al. |
| 6,128,000 A | 10/2000 | Jouppi et al. |
| 6,137,918 A | 10/2000 | Harrington et al. |
| 6,188,394 B1 | 2/2001 | Morein et al. |
| 6,199,150 B1 * | 3/2001 | Yoshikawa ................... 711/170 |
| 6,204,859 B1 | 3/2001 | Jouppi et al. |
| 6,249,853 B1 | 6/2001 | Porterfield |

(Continued)

FOREIGN PATENT DOCUMENTS

| | | |
|---|---|---|
| CN | 101241476 | 8/2008 |
| TW | 498212 | 8/2002 |
| TW | 550591 | 9/2003 |

OTHER PUBLICATIONS

Weikum, G, Data Partitioning and load balancing in parallel storage system. Jun. 12, 1994. IEEE Thirteenth IEEE Symposium, First International Symposium.*

(Continued)

*Primary Examiner* — Mardochee Chery
*Assistant Examiner* — Khoa D Doan

(57) ABSTRACT

Embodiments of the present technology are directed toward techniques for balancing memory accesses to different memory types.

18 Claims, 9 Drawing Sheets

(56) References Cited

U.S. PATENT DOCUMENTS

| | | |
|---|---|---|
| 6,362,819 B1 | 3/2002 | Dalal et al. |
| 6,366,289 B1 | 4/2002 | Johns |
| 6,393,504 B1 | 5/2002 | Leung et al. |
| 6,429,877 B1 | 8/2002 | Stroyan |
| 6,438,062 B1 | 8/2002 | Curtis et al. |
| 6,446,158 B1 | 9/2002 | Karabatsos |
| 6,452,595 B1 | 9/2002 | Montrym et al. |
| 6,469,707 B1 | 10/2002 | Voorhies |
| 6,480,205 B1 | 11/2002 | Greene et al. |
| 6,496,916 B1 | 12/2002 | Fadavi-Ardekani et al. |
| 6,526,473 B1 | 2/2003 | Kim |
| 6,584,545 B2 * | 6/2003 | Bachmat et al. ............. 711/114 |
| 6,614,444 B1 | 9/2003 | Duluk, Jr. et al. |
| 6,633,297 B2 | 10/2003 | McCormack et al. |
| 6,681,310 B1 * | 1/2004 | Kusters et al. ............... 711/202 |
| 6,717,578 B1 | 4/2004 | Deering |
| 6,833,835 B1 | 12/2004 | van Vugt |
| 6,879,266 B1 | 4/2005 | Dye et al. |
| 7,017,068 B2 | 3/2006 | McBride et al. |
| 7,064,771 B1 | 6/2006 | Jouppi et al. |
| 7,138,295 B2 | 11/2006 | Leedy |
| 7,149,924 B1 | 12/2006 | Zorian et al. |
| 7,158,148 B2 | 1/2007 | Toji et al. |
| 7,197,662 B2 | 3/2007 | Bullen et al. |
| 7,508,398 B1 | 3/2009 | Montrym et al. |
| 7,512,734 B2 * | 3/2009 | Sutardja ........................ 711/112 |
| 7,620,793 B1 | 11/2009 | Edmondson et al. |
| 7,698,607 B2 | 4/2010 | Willis |
| 7,818,636 B1 | 10/2010 | Sutardja et al. |
| 7,884,829 B1 | 2/2011 | Van Dyke et al. |
| 7,917,671 B2 * | 3/2011 | Chilukoor et al. ............. 710/38 |
| 7,932,912 B1 | 4/2011 | Van Dyke |
| 8,095,762 B1 | 1/2012 | Schulze et al. |
| 8,146,092 B2 * | 3/2012 | Ogawa et al. ................. 718/105 |
| 8,281,104 B2 * | 10/2012 | Crowther et al. ............ 711/173 |
| 8,347,064 B1 | 1/2013 | Glasco et al. |
| 8,347,065 B1 | 1/2013 | Glasco et al. |
| 8,352,709 B1 | 1/2013 | Glasco et al. |
| 8,543,792 B1 | 9/2013 | Glasco et al. |
| 8,621,176 B2 * | 12/2013 | Schindler ..................... 711/173 |
| 8,661,207 B2 * | 2/2014 | Kim et al. ..................... 711/151 |
| 8,686,977 B2 * | 4/2014 | Park et al. ..................... 345/204 |
| 8,700,883 B1 | 4/2014 | Glasco et al. |
| 8,706,975 B1 | 4/2014 | Glasco et al. |
| 8,793,463 B2 * | 7/2014 | Moss et al. ................... 711/170 |
| 2001/0049766 A1 | 12/2001 | Stafford |
| 2002/0038404 A1 | 3/2002 | Ryan |
| 2002/0083264 A1 * | 6/2002 | Coulson ....................... 711/112 |
| 2002/0140655 A1 | 10/2002 | Liang et al. |
| 2004/0078700 A1 | 4/2004 | Jeong |
| 2004/0093457 A1 | 5/2004 | Heap |
| 2004/0252547 A1 | 12/2004 | Wang |
| 2004/0257891 A1 | 12/2004 | Kim et al. |
| 2005/0172074 A1 * | 8/2005 | Sinclair ......................... 711/114 |
| 2005/0240745 A1 * | 10/2005 | Iyer et al. ..................... 711/167 |
| 2006/0101218 A1 | 5/2006 | Reed |
| 2006/0277360 A1 * | 12/2006 | Sutardja et al. .............. 711/113 |
| 2007/0113126 A1 | 5/2007 | Ong |
| 2007/0198722 A1 * | 8/2007 | Kottomtharayil et al. ... 709/226 |
| 2008/0091901 A1 | 4/2008 | Bennett et al. |
| 2008/0094924 A1 | 4/2008 | Ross |
| 2008/0126716 A1 * | 5/2008 | Daniels ........................ 711/154 |
| 2009/0049335 A1 | 2/2009 | Khatri et al. |
| 2009/0147598 A1 | 6/2009 | Norman |
| 2009/0248958 A1 * | 10/2009 | Tzeng ........................... 711/103 |
| 2009/0276597 A1 | 11/2009 | Reed |
| 2010/0153680 A1 * | 6/2010 | Baum et al. .................. 711/173 |
| 2010/0313061 A1 | 12/2010 | Huth et al. |
| 2011/0066792 A1 | 3/2011 | Shaeffer et al. |
| 2011/0072208 A1 * | 3/2011 | Gulati et al. .................. 711/114 |
| 2011/0087840 A1 | 4/2011 | Glasco et al. |
| 2011/0141122 A1 * | 6/2011 | Hakura et al. ................ 345/505 |
| 2011/0145468 A1 * | 6/2011 | Diard et al. ................... 710/313 |
| 2011/0167229 A1 * | 7/2011 | Szalay et al. ................. 711/154 |
| 2011/0197039 A1 * | 8/2011 | Green et al. .................. 711/162 |
| 2011/0231631 A1 * | 9/2011 | Matsuzawa et al. ......... 711/209 |
| 2011/0246711 A1 | 10/2011 | Koga |
| 2012/0089792 A1 | 4/2012 | Fahs et al. |
| 2012/0185644 A1 * | 7/2012 | Kaneko et al. ............... 711/114 |
| 2012/0272025 A1 * | 10/2012 | Park et al. .................... 711/162 |
| 2013/0031328 A1 | 1/2013 | Kelleher et al. |
| 2013/0100746 A1 | 4/2013 | Rajan et al. |

OTHER PUBLICATIONS

Uzi Vishkin, Dynamic Parallel Memories. IP Electronic Publication Sep. 15, 2005.*
IBM, AIX520: Balancing Memory Resources. IP Electronic Publication Jun. 21, 2003.*
Method and System for Direct Memory Access (DMA) to a logical partition memory. IP Electronic Publication Jun. 4, 2010.*

* cited by examiner

TECHNIQUES FOR BALANCING ACCESSES TO MEMORY HAVING DIFFERENT MEMORY TYPES

BACKGROUND OF THE INVENTION

A number of electronic devices include one or more computing devices such as one or more central processing units (CPU), one or more graphics processing units (GPU), one or more digital signal processors (DSP), and/or the like. The computing device, herein after simply referred to as a processor, executes computing device readable instructions (e.g., computer programs) and operates on data stored in one or more computing device readable media, herein after simply referred to as memory. To access instructions and data stored in memory, the processor may include one or more memory controllers and one or more memory interfaces. For example, a processor 110 may include a memory controller 115 and a plurality of memory interfaces 120-135 for accessing frame buffer memory 140-155, as illustrated in FIG. 1. It is appreciated that the memory interface may be separate from or integral to the memory controller. However, for ease of understanding, the conventional art and embodiments of the present technology will be described with regard to separate memory controllers and memory interfaces. The memory controller generally converts addresses in one memory space to addresses in another memory space. For example, the memory controller may convert logical addresses to physical addresses. The memory interface generally converts addresses in a given memory space to electrical signals to drive address, data and control lines, and receives electrical signals on the address, data and control lines, for reading and writing data and/or computer readable instructions to or from the memory.

The processor also includes a number of other functional blocks not shown. For example, the processor may include a plurality of processor cores, one or more communication interfaces, and the like. Processors are well known in the art and therefore those aspects of the processor that are not germane to an understanding of the present technology will not be discussed further.

The performance of the electronic device and/or the processor of the electronic device is determined by a number of factors, including the amount of memory, the speed at which the memory can be accessed, the power consumed, and/or the like. Generally, the larger the storage capacity the more the memory costs. Similarly, the faster the memory device is, the more the memory costs and the more power the memory device consumes. Generally, the processor and memory are not utilized at peak performance most of the time. Instead, most of the time the processor and memory are idle (e.g., standby or sleep mode) or have a low workload. In addition, a manufacturer may offer a plurality of models of an electronic device based upon a common device architecture. For example, a family of graphics processors having a common device architecture may include a first model that includes 4 GB of SDDR3 (double data rate synchronous dynamic random access memory) memory operating at 1 GHz, another model may include 2 GB of GDDR5 memory operating at 2 GHz. Generally, the conventional processor and memory systems limit the ability to provide multiple models having a common device architecture that offer different levels of performance based upon memory storage capacity, memory access speed, power consumption, costs and combinations thereof. Accordingly, there is a continuing need for improved memory subsystems in computing devices such as central processing units, graphics processing units, digital signal processing units, microcontrollers, and the like.

SUMMARY OF THE INVENTION

The present technology may best be understood by referring to the following description and accompanying drawings that are used to illustrate embodiments of the present technology directed toward techniques for balancing memory accesses to memory having different memory types.

In one embodiment, one or more parameters, including a data rate, of a plurality of different types of memory devices coupled to a computing device are determined. A memory mapping algorithm is then configured to balance traffic to memory devices including a plurality of different memory types as a function of the one or more determined parameters including the data rate of the memory devices.

In another embodiment, for each received memory access requests, locations in a plurality of memory devices are determined. The locations are determined from a mapping that balances traffic between two or more memories of different memory types as a function of one or more parameters including a data rate of the different memory types. The locations in the corresponding memory devices may then be accessed.

BRIEF DESCRIPTION OF THE DRAWINGS

Embodiments of the present technology are illustrated by way of example and not by way of limitation, in the figures of the accompanying drawings and in which like reference numerals refer to similar elements and in which.

DETAILED DESCRIPTION OF THE INVENTION

Figure 1:
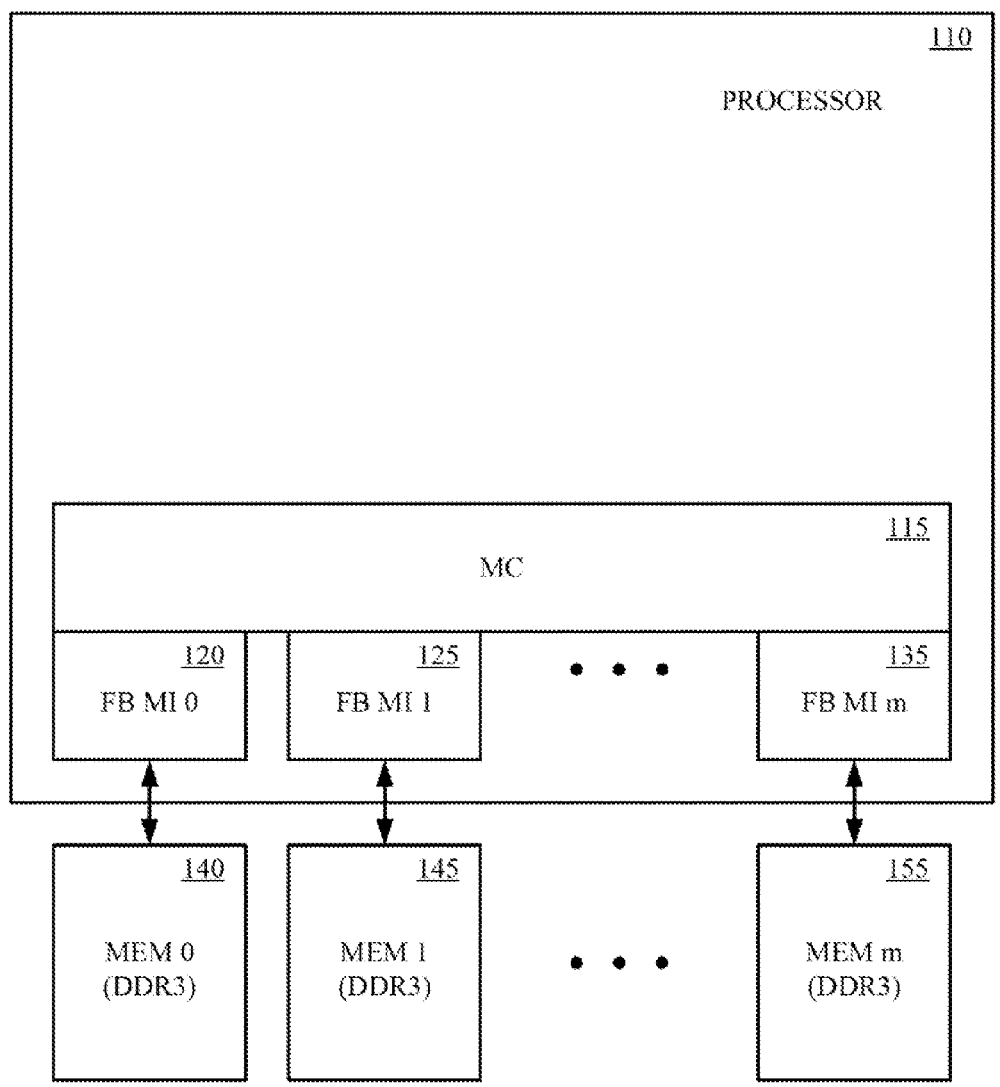
FIG. 1 shows a block diagram of an electronic device including a processor and memory according to one embodiment of the conventional art.

Reference will now be made in detail to the embodiments of the present technology, examples of which are illustrated in the accompanying drawings. While the present technology will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Some embodiments of the present technology which follow are presented in terms of routines, modules, logic blocks, and other symbolic representations of operations on data within one or more electronic devices. The descriptions and representations are the means used by those skilled in the art to most effectively convey the substance of their work to others skilled in the art. A routine, module, logic block and/or the like, is herein, and generally, conceived to be a self-consistent sequence of processes or instructions leading to a desired result. The processes are those including physical manipulations of physical quantities. Usually, though not necessarily, these physical manipulations take the form of one or more electric or magnetic signals capable of being stored, transferred, compared and otherwise manipulated in a electronic device. For reasons of convenience, and with reference to common usage, these signals are referred to as data, bits, values, elements, symbols, characters, terms, numbers, strings, and/or the like with reference to embodiments of the present technology.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussion, it is understood that through discussions of the present technology, discussions utilizing the terms such as "receiving," and/or the like, refer to the action and processes of an electronic device such as an electronic computing device that manipulates and transforms data. The data are represented as physical (e.g., electronic signals) quantities within the electronic device's logic circuits, registers, memories and/or the like, and is transformed into other data similarly represented as physical quantities within the electronic device.

In this application, the use of the disjunctive is intended to include the conjunctive. The use of definite or indefinite articles is not intended to indicate cardinality. In particular, a reference to "the" object or "a" object is intended to denote also one of a possible plurality of such objects.

Figure 2:
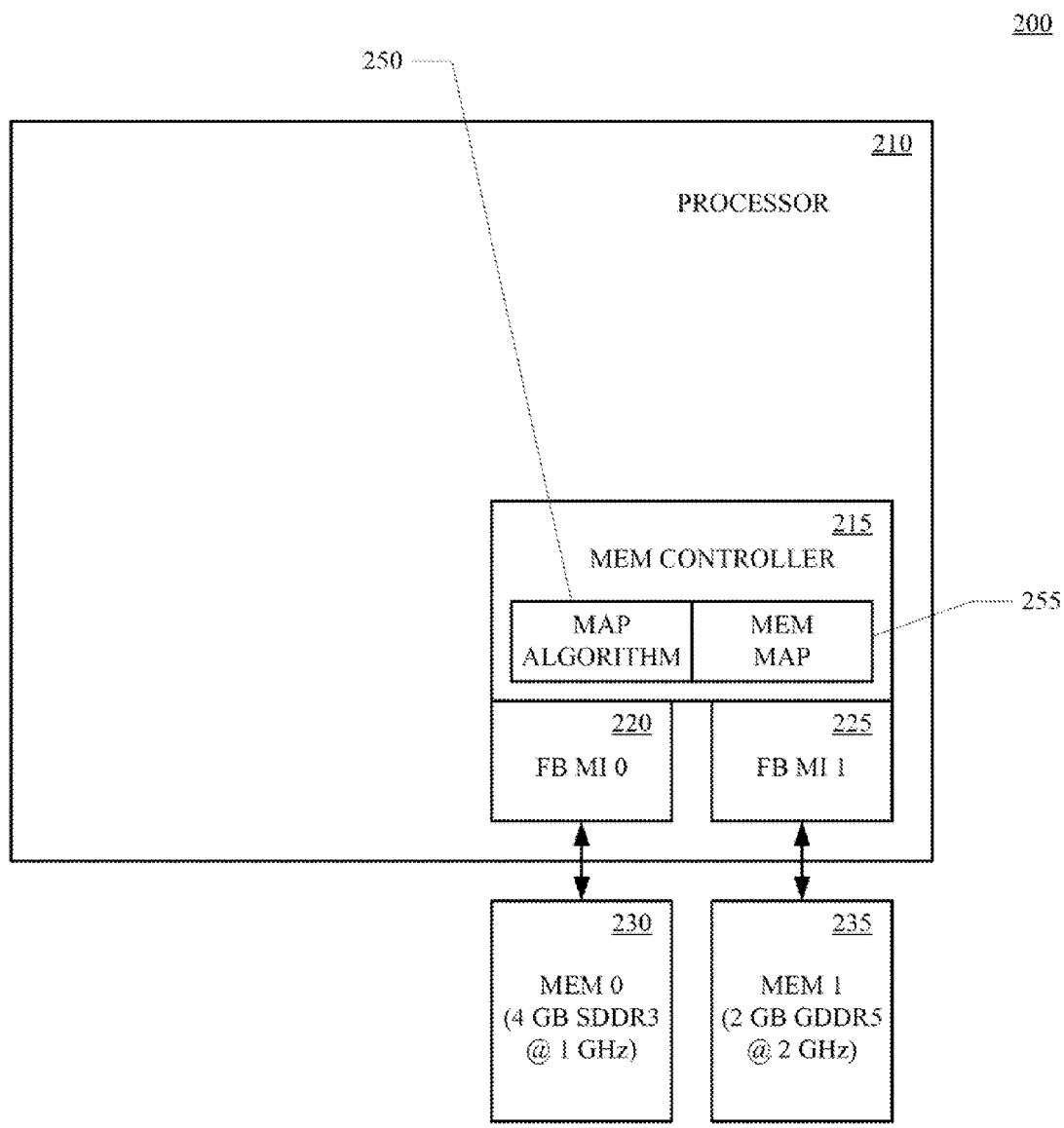
FIG. 2 shows a block diagram of an electronic device including a processor and memory, in accordance with one embodiment of the present technology.
Figure 3:
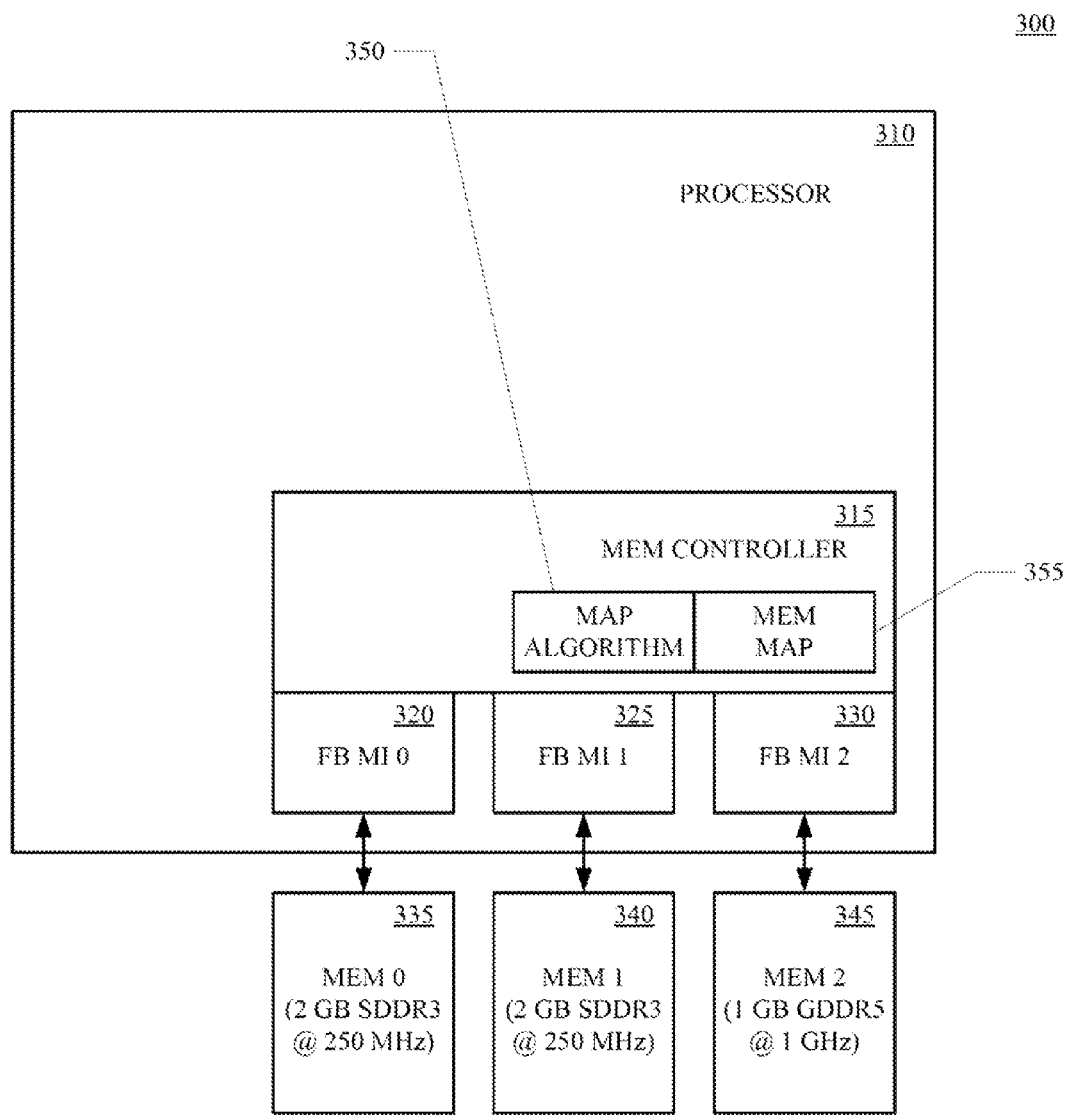
FIG. 3 shows a block diagram of an electronic device including a processor and memory, in accordance with another embodiment of the present technology.

Referring now to FIGS. 2 and 3, an electronic device including a processor and memory, in accordance with one embodiment of the present technology, is shown. The processor includes one or more memory controllers and a plurality of memory interfaces. Each memory interface may be coupled to a respective memory device in a plurality of partitions. A first partition may include one or more memory devices operating at a first data rate. A second partition may include one or more memory devices operating at a second data rate. For example, a GPU may include two frame buffer interfaces. A first frame buffer interface may be coupled to a 4 GB of SDDR3 memory operating at a data rate of 1 GHz. A second frame buffer interface may be coupled to 2 GB of GDDR5 memory operating at a data rate of 2 GHz, as illustrated in FIG. 2. In another example, a first and second frame buffer interface may each be coupled to a respective 2 GB of SDDR3 memory operating at a data rate of 250 MHz. A third frame buffer interface may be coupled to 1 GB of GDDR5 memory operating at 1 GHz, as illustrated in FIG. 3. The configuration and operation of the electronic devices in accordance with embodiments of the present technology will be further explained with reference to FIGS. 4 and 5.

Figure 4:
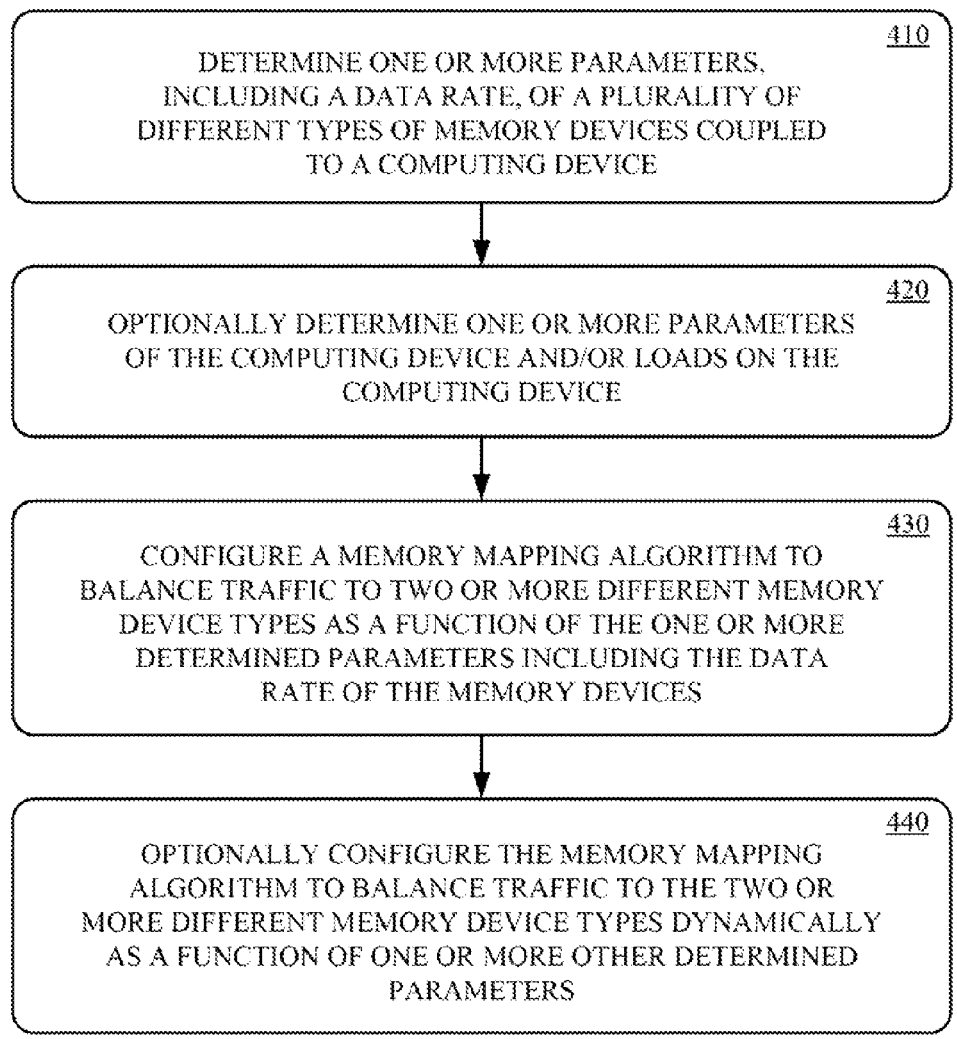
FIG. 4 shows a flow diagram of a method of setting up a processor and memory to support different memory types, in accordance with one embodiment of the present technology.

Referring now to FIG. 4, a method of initializing a processor and memory to support different memory types, in accordance with one embodiment of the present technology, is shown. The method may be implemented in hardware, firmware, software or any combination thereof. Initialization of the processor may include determining one or more parameters for each of a plurality of different types of memory 230-235, 335-345 coupled to a processor, at 410. The one or more parameters include the data rate of each of the plurality of partitions. The parameters may also include the storage capacity of each partition, the memory width of each partition, the power consumption of each partition, and/or the like. In one implementation, the data rate of the plurality of partitions is determined based upon programmable settings in the processor. The programmable settings of the processor may for example be configured to set the clocks (e.g., CK and WCK) for operation of the memory devices. The data rate of each partition is related to the clock speed at which the processor is configured to operate with each respective partition. For instance, it may be determined that the processor is configured to operate with a first partition of SDDR3 memory at a clock of 250 MHz for a data rate of 1 GHz and a second partition of GDDR5 memory at a clock of 500 MHz for a data rate of 2 GHz. It may also be determined that 4 GB of SDDR3 memory is coupled to a first 64 bit wide memory interface, and 2 GB of GDDR5 memory is coupled to a second 64 bit wide memory interface, for the example illustrated in FIG. 2. In another example, it may be determined that the processor is configured to operate with a first partition of two 2 GB SDDR3 memory devices operating at a data rate of 1 GHz, and a second partition of one 1 GB GGDR5 memory device operating at a rate of 4 GHz, as illustrated in FIG. 3.

Referring again to FIG. 4, one or more parameters of the processor 210, 310 or loads on the processor (e.g., applications) may also be determined, at optional process 420. The one or more parameters of the processor may include the number of memory interfaces coupling the memory to the processor in each partition, or the like. For example, it may be determined that the processor includes two frame buffer memory interfaces, one coupled to a first partition of 1 GHz SDDR3 memory and a second coupled to 2 GHz GDDR5 memory as illustrated in FIG. 2. In another example, it may be determined that the processor includes three frame buffer memory interfaces, wherein a first and second frame buffer memory interface are each coupled to 2 GB of 1 GHz SDDR3 memory and a third frame buffer memory interface is coupled to 1 GB of 4 GHz GDDR5 as illustrated in FIG. 3 The one or more parameters of the processing load may include a type of processing, the memory bandwidth, memory latency, the amount of memory needed, or the like. For example, the processing type may be MPEG rendering, three-dimensional rendering or the like. The memory bandwidth may be a prediction of the memory utilizations such as idle, low or high.

Referring again to FIG. 4, a memory mapping algorithm 250, 350 is configured to balance traffic to two or more different memory types 230-235, 335-345 as a function of the one or more determined parameters including the data rate, at 430. In one implementation, the memory mapping algorithm 250, 350 is configured to generate a memory map 255, 355 that balances traffic between two or more partitions having different data rates 230-235, 335-345. The traffic may be balanced by striping memory access across the two or more partitions 230-235, 335-345 as a function of the different data rates. For example, if a first partition of 1 GHz SDDR3 and a second partition of 2 GHz GDDR5 are coupled to the processor as illustrated in FIG. 2, the mapping algorithm may be configured to store data in the first and second partitions at a ratio of 1 KB to 2 KB chunks respectively. If a first partition of two 1 GHz SDDR3 memory devices and a second partition of one 4 GHz GDDR5 memory device are coupled to the processor as illustrated in FIG. 3, the mapping algorithm may be configured to store each 6 KB of data in 1 KB chunks in each of the two 1 GHz SDDR3 memory devices and 4 KB chunks in the one 4 GHz GDDR5. The data may be striped across different memory devices. If there is additional memory in one of the memory devices, the leftover memory may be mapped separately, non-striped, so that all the memory is accessible. The one or more partitions of leftover memory, in one implementation, can be accessed at one or more other locations as contiguous memory respectively.

Referring again to FIG. 4, the memory mapping algorithm 250, 350 may be dynamically configured to balance traffic to the two or more different memory type further as a function of one or more of the determined parameters, at optional process 440. For example, the memory mapping algorithm 250, 350 may be dynamically configured to direct memory accesses to the first partition if a memory access traffic load parameter is in a predetermined range, such as MPEG decoding, idle or low processing load. While for a second type of processing or second memory bandwidth requirement, such as three-dimensional rendering or a high processing load, the mapping algorithm is configured to direct memory accesses to the first and second partitions as a function of the data rate of each partition. Alternatively or in addition, the memory mapping algorithm 250, 350 may be dynamically configured to direct memory accesses to the first partition if a power consumption parameter is in a predetermined range, such as when operating on a battery instead of plugged into an electrical outlet.

Figure 5:
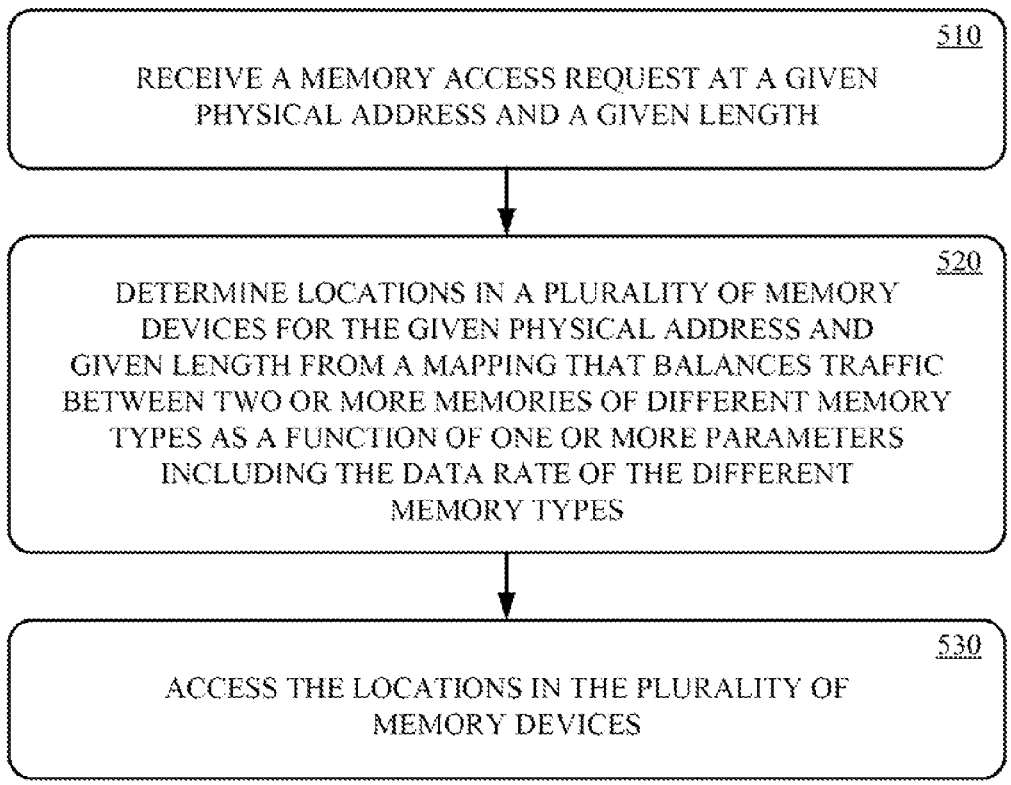
FIG. 5 shows a flow diagram of a method of accessing memory having different memory types, in accordance with one embodiment of the present technology.

Referring now to FIG. 5, a method of accessing memory having different memory types in different partitions, in accordance with one embodiment of the present technology, is shown. The method may be implemented in hardware, firmware, software or any combination thereof. At 510, a memory access request at a given physical address and a given length is received. The memory access request may be a read memory access, a write memory access, an erase memory access and/or the like. In one implementation, the memory access request is received by a memory controller 215, 315.

At 520, locations in a plurality of memory device 230-235, 335-345 are determined for the given physical address and given length from a mapping 255, 355 that balances traffic between two or more memories of different memory types as a function of one or more parameters including the data rate of the different memory types. For example, a memory write access to 6 KB starting at a given physical address may be mapped to stripe a first 1 KB chunk to a 1 GHz SDDR3 memory device coupled to a first frame buffer memory interface, a second and third 1 KB chunks to a 2 GHz GDDR5 memory device coupled to a second frame buffer memory interface, a fourth 1 KB chunk to the 10 Hz SDDR3 memory device, and a fifth and sixth 1 KB chunk to the 2 GHz GDDR5 memory device, as illustrated in FIG. 2. Thereafter, the mapping 255, 355 may be used for reading the data or portions thereof from the SDDR3 and/or GDDR5 memory. In another example, a memory write access to 6 KB starting at a given physical address may be mapped to stripe a first 1 KB chunk to a first 1 GHz SDDR3 memory device, a second 1 KB chunk to a second 1 GHz SDDR3 memory device, and third, forth, fifth and sixth 1 KB chunks to a first 4 GHz GDDR5 memory device, as illustrated in FIG. 3. In one implementation, the mapping may be stored in a memory mapping table 255, 355 used by the memory controller 215, 315.

Referring again to FIG. 5, one or more memory interfaces 220-225, 320-330 are used to access the locations in the corresponding memory devices 230-235, 335-345 of different memory types, at 530. In one implementation, the memory controller 215, 315 dispatches the memory access requests to the given memory interfaces 230-235, 335-345 determined from the memory mapping table 255, 355 as a function of one or more parameters including the data rate of the different memory types.

In one implementation, the method of initializing a processor and memory to support different memory types may be performed during the manufacturing of the computing device. For example, a manufacturer may design a family of processor having a common modular architecture that may be configured to implement a plurality of different processors or electronic circuits, such as a basic GPU, and a better GPU. The performance of the processor is determined by a number of factors, including the amount of memory, the speed at which the memory can be accessed, and the power consumed by the memory. It is difficult to predict the performance of the competitor's processor offerings. However, it would be advantageous to offer a basic GPU that out performs the competing offerings by a given amount (e.g., 20-50%). In addition, it is advantageous that the better GPU provide a given amount of additional performance over the basic GPU (e.g., 20-50% better performance). Embodiments of the present technology enable a manufacturer to choose the mix of memory coupled to the processor late in the manufacturing cycle (e.g., during circuit board assembly) to achieve a given set of performance parameters. For example, the execution speed and power consumption by the basic GPU may beat the competition's offering with two 2 GB SDDR3 memory IC operating at a 1 GHz data rate coupled to two frame buffer memory interface in a 128 bit-wide memory configuration. A processor with one 4 GB SDDR3 memory IC operating at 1 GHz and a 2 GB GDDR5 operating at 2 GHz may provide the additional processing speed, while conserving power and keeping costs lower than if two GDDR5 memory chips were used. Accordingly, a manufacturer may advantageously meet a mix of performance metrics for a product family utilizing the techniques for initializing and operation of a processor and memory supporting different memory types in accordance with embodiments of the present technology.

Figure 6:
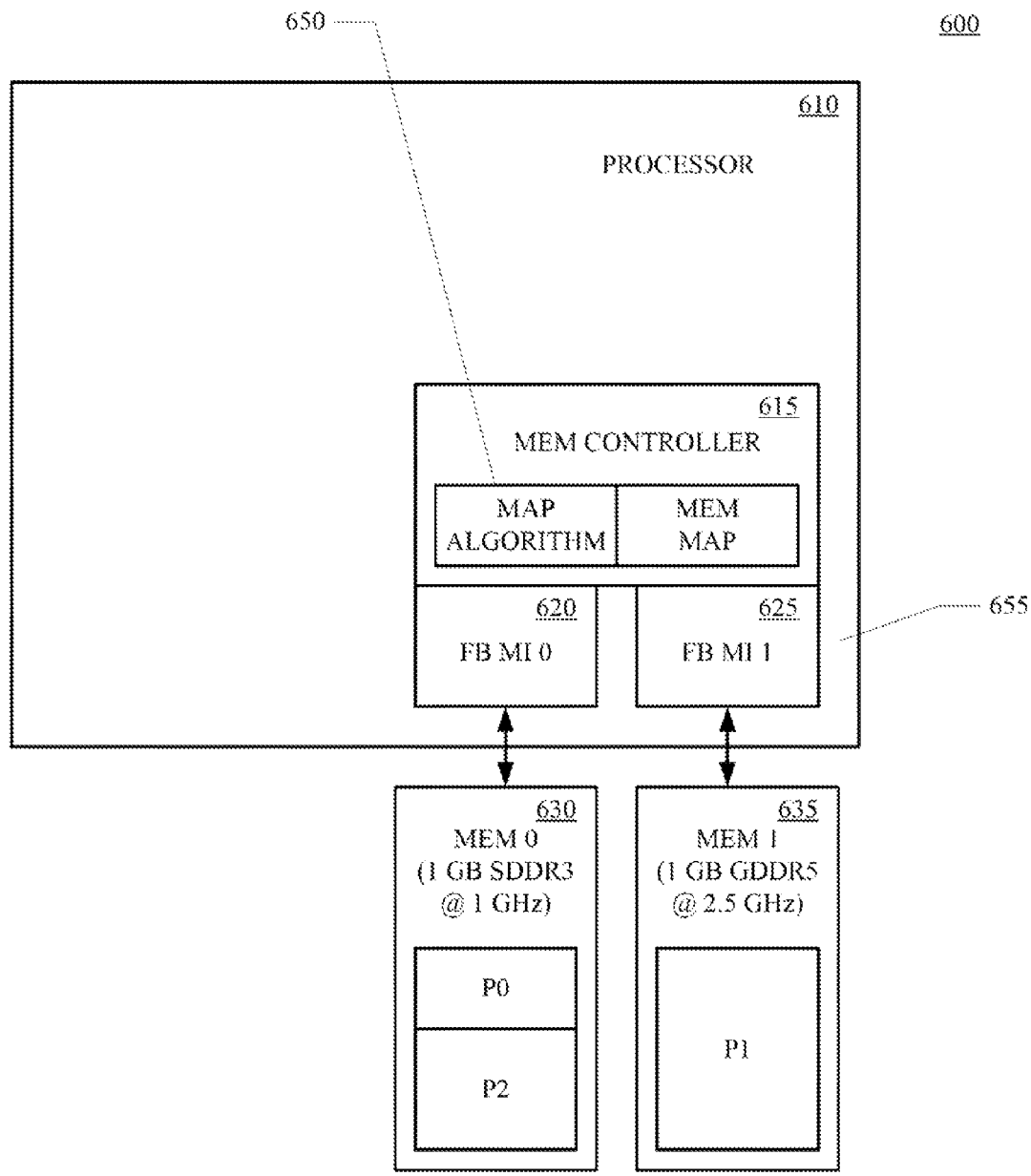
FIG. 6 shows a block diagram of an electronic device including a processor and memory, in accordance with another embodiment of the present technology.

Referring now to FIG. 6, an electronic device including a processor and memory, in accordance with another embodiment of the present technology, is shown. The processor includes one or more memory controllers and a plurality of memory interfaces. Each memory interface may be coupled to a respective memory device. One or more memory devices may be organized into one or more partitions. A first set of partitions may include one or more memory devices operating at a first data rate and one or more memory devices operating at a second data rate. A second set of partitions may include one or more memory device operating at the first data rate. For example, a GPU may include two frame buffer interfaces. A first frame buffer interface may be coupled to a 1 GB of SDDR3 memory operating at a data rate of 1 GHz. A second frame buffer interface may be coupled to 1 GB of GDDR5 memory operating at a data rate of 2.5 GHz. A first set of partitions may include a first partition (P0) of the 1 GB of SDDR3 memory operating at a data rate of 1 GHz, and a second partition (P1) of the 1 GB of GDDR5 memory operating at a data rate of 2.5 GHz. A second set of partitions may include a third partition (P2) of the 1 GB of SDDR3 memory operating at a data rate of 1 GHz.

Figure 7:
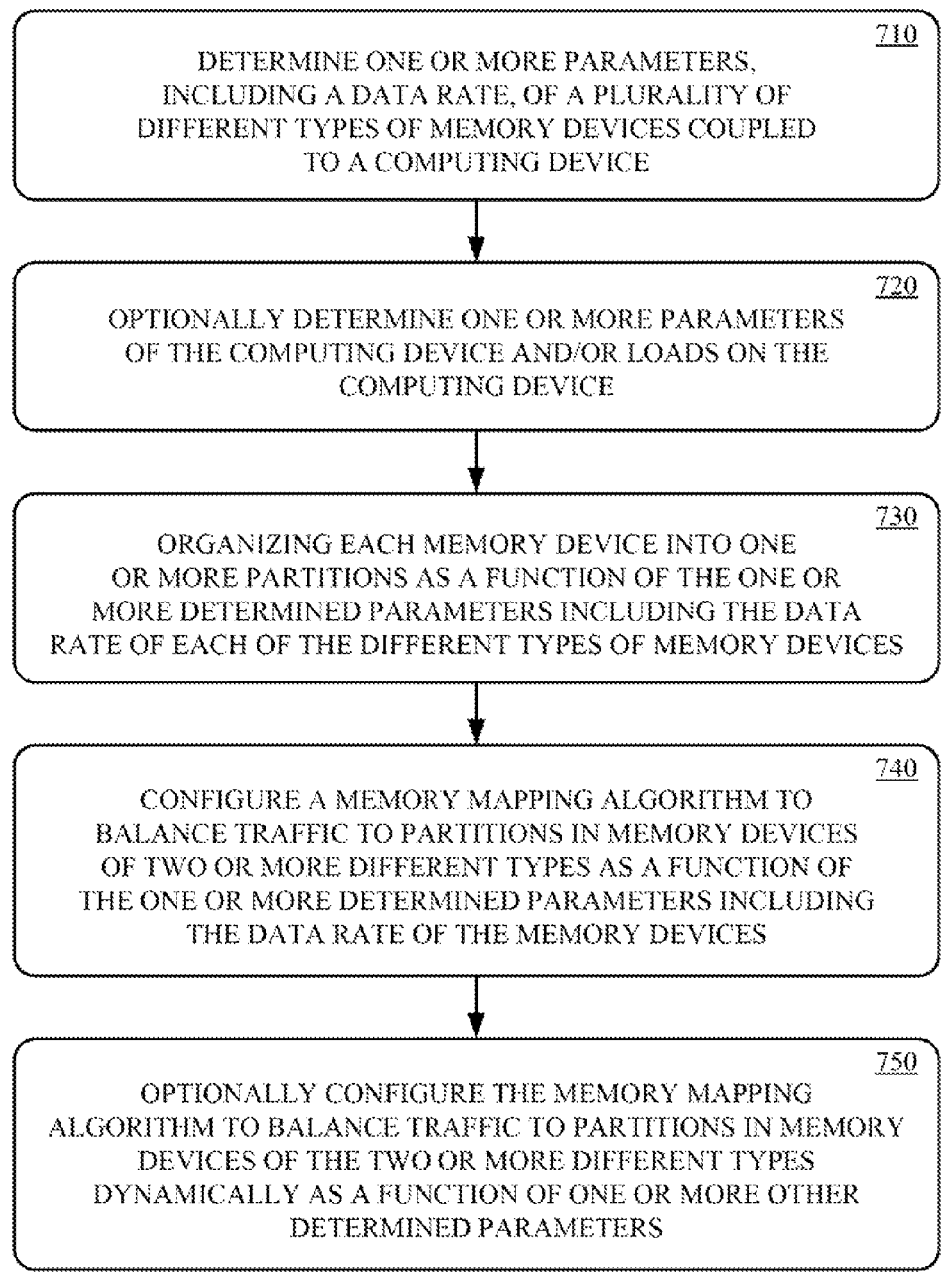
FIG. 7 shows a flow diagram of a method of setting up a processor and memory to support different memory types, in accordance with another embodiment of the present technology.

Referring now to FIG. 7, a method of initializing a processor and memory to support different memory types, in accordance with one embodiment of the present technology, is shown. The method may be implemented in hardware, firmware, software or any combination thereof. Initialization of the processor may include determining one or more parameters for each of a plurality of different types of memory 630, 635 coupled to a processor, at 710. The one or more parameters may include the data rate of each of the plurality of memory devices. The parameters may also include the storage capacity of each device, the memory width of each device, the power consumption of each device, and/or the like. In one implementation, the data rate of the plurality of memory devices is determined based upon programmable settings in the processor. The programmable settings of the processor may for example be configured to set the clocks (e.g., CK and WCK) for operation of the memory devices. The data rate of each memory device is related to the clock speed at which the processor is configured to operate with each respective device. For instance, it may be determined that the processor is configured to operate with a SDDR3 memory at a clock of 250 MHz for a data rate of 1 GHz 630 and a GDDR5 memory at a clock of 625 MHz for a data rate of 2.5 GHz 635.

At optional process 720, one or more parameters of the processor 610 or loads on the processor (e.g., applications) may also be determined. The one or more parameters of the processor may include the number of memory interfaces coupling the memory to the processor in each partition, or the like. For example, it may be determined that the processor includes two frame buffer memory interfaces 620, 625, one coupled to a 1 GHz SDDR3 memory 630 and a second coupled to 2.5 GHz GDDR5 memory 635. The one or more parameters of the processing load may include a type of processing, the memory bandwidth, memory latency, the amount of memory needed, or the like. For example, the processing type may be MPEG rendering, three-dimensional rendering or the like. The memory bandwidth may be a prediction of the memory utilizations such as idle, low or high.

At 730, each memory device is organized into one or more partitions as a function of the one or more determined parameters including the data rate of each of the different type of memory devices. For example, for a 1 KB page size, 5 KB of memory may in the 2.5 GHz GDDR5 memory 635 in the same amount of time as 2 KB of the 1 GHz SDDR3 memory 630. Therefore, in the same amount of time that it takes to access the entire 1 GB of the 2.5 GHz GDDR memory 635, only 0.4 GB of 1 GB, 1 GHz SDDR3 memory can be accessed. Accordingly, the 1 GB, 1 GHz SDDR3 memory 630 may be organized into a 0.4 GB partition (P0) and a 0.6 GB partition (P2), and the 1 GB, 2.5 GHz GDDR5 memory 635 may be organized into a 1 GB partition (P1).

At 740, a memory mapping algorithm 640 is configured to balance traffic to partitions in the memory devices of two or more different memory types 630, 635 as a function of the one or more determined parameters including the data rate. In one implementation, the memory mapping algorithm 640 is configured to generate a memory map 645 that balances traffic between a plurality of partitions having different data rates. The traffic may be balanced by striping memory access across the plurality of partitions as a function of the different data rates of the memory devices. For example, if 1 GB of 1 GHz SDDR3 630 and 1 GB of 2.5 GHz GDDR5 635 are coupled to the processor 610, the mapping algorithm may be configured to store data in a first partition of 0.4 GB of the 1 GHz SDDR3 memory 630 and a second partition of 1 GB of the 2.5 GDDR6 memory 635 at a ratio of 2:5, and a third partition of 0.6 GB of the 1 GHz SDDR3 memory 630. The data may be striped across the first P0 and second partitions P1. The leftover memory of the third partition P2 may be mapped separately, non-striped, so that all the memory is accessible.

At 750, the memory mapping algorithm 640 may be dynamically configured to balance traffic to partitions in memory devices of the two or more different memory types further as a function of one or more other determined parameters. For example, the memory mapping algorithm 640 may be dynamically configured to direct memory accesses to the third partition if a memory access traffic load parameter is in a predetermined range, such as MPEG decoding, idle or low processing load. While for a second type of processing or second memory bandwidth requirement, such as three-dimensional rendering or a high processing load, the mapping algorithm is configured to direct memory accesses to the first and second partitions as a function of the data rate of each partition. Alternatively or in addition, the memory mapping algorithm 640 may be dynamically configured to direct memory accesses to the first and third partitions if a power consumption parameter is in a predetermined range, such as when operating on a battery instead of plugged into an electrical outlet.

Figure 8:
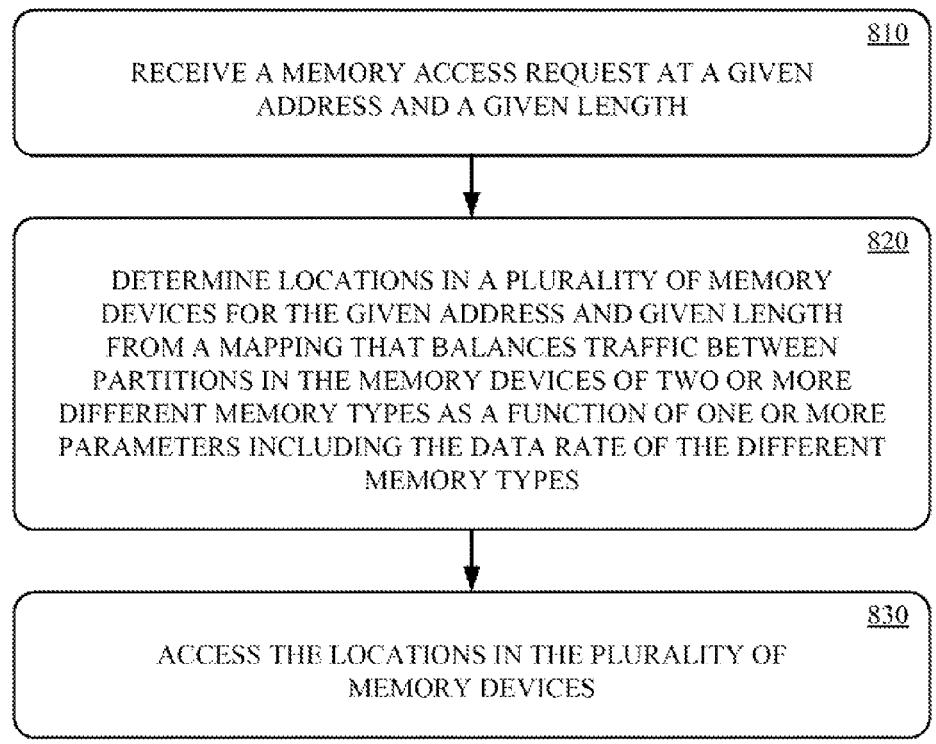
FIG. 8 shows a flow diagram of a method of accessing memory having different memory types, in accordance with another embodiment of the present technology.

Referring now to FIG. 8, a method of accessing memory having different memory types in different partitions, in accordance with one embodiment of the present technology, is shown. The method may be implemented in hardware, firmware, software or any combination thereof. At 810, a memory access request at a given physical address and a given length is received. The memory access request may be a read memory access, a write memory access, an erase memory access and/or the like. In one implementation, the memory access request is received by a memory controller 615.

Figure 9:
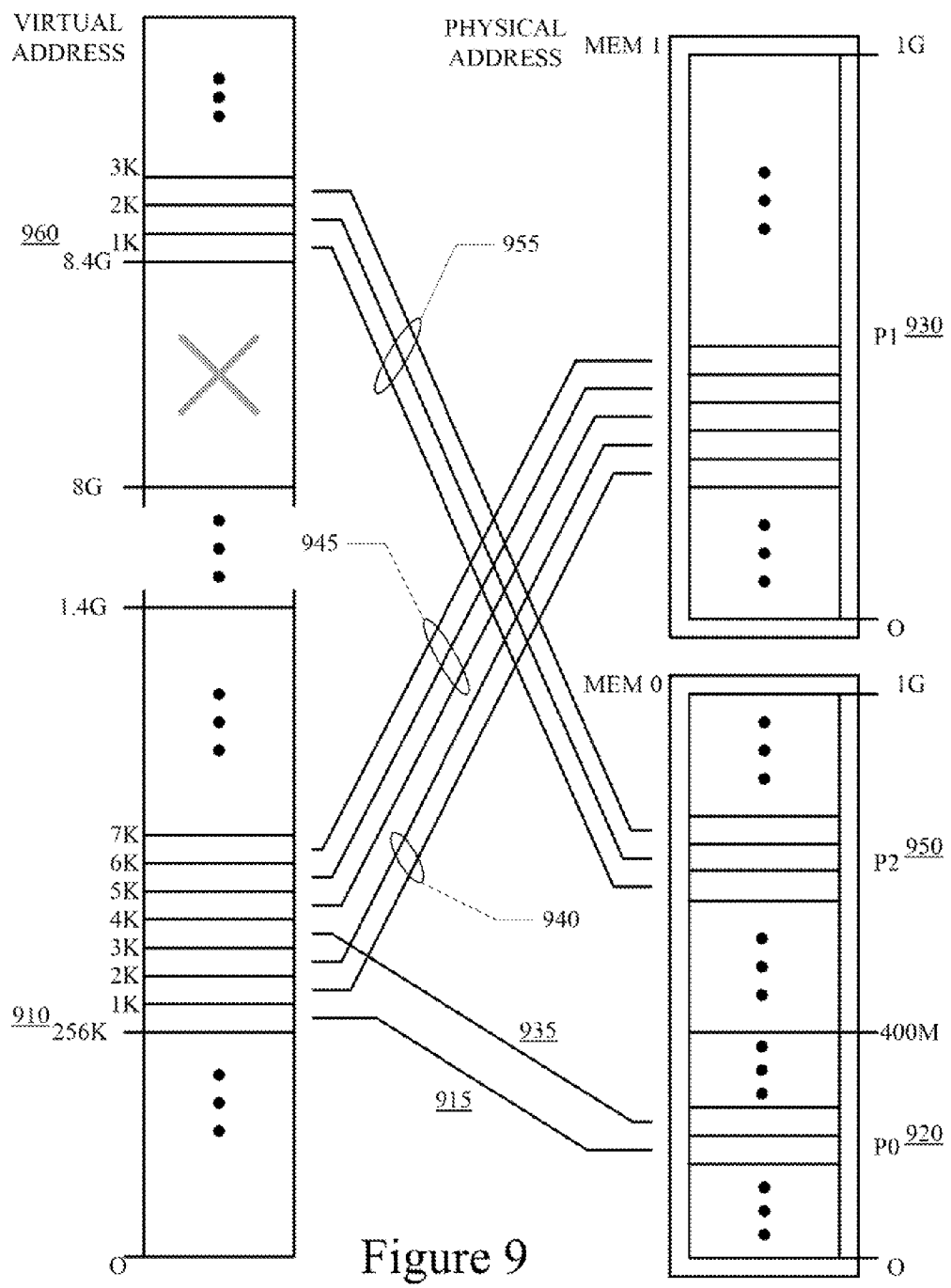
FIG. 9 shows a block diagram illustrating a memory space of a processor supporting different memory types, in accordance with one embodiment of the present technology.

At 820, locations in a plurality of memory device 630, 635 are determined for the given physical address and given length from a mapping 645 that balances traffic between partitions in the memory devices of two or more different memory types as a function of one or more parameters including the data rate of the different memory types. For example, as illustrated in FIG. 9, a memory write access to 7 KB starting at a given physical address 910 may be mapped to stripe a first 1 KB page 915 to a first 0.4 GB partition P0 920 of a 1 GHz SDDR3 memory device 630, second and third 1 KB pages 925 to a second 1 GB partition P1 930 of a 2.5 GHz GDDR5 memory device 635, a fourth 1 KB page 935 to the 0.4 GB partition P0 920 of the 1 GHz SDDR3 memory device 630, and fifth, sixth and seventh 1 KB pages 940 to the 1 GB partition P1 930 of the 2 GHz GDDR5 memory device 635. The 1 GB of 2.5 GHz GDDR5 memory 635 will be consumed, while only 0.4 GB of the 1

GHz SDDR3 memory 630 will be utilized. Therefore, the additional 0.6 GB of the 1 GHz SDDR3 memory 950 in a third partition P2 is mapped 955 to linear address starting at a predetermined offset 960. In one implementation, the memory space of the 1 GHz SDDR3 memory device 630 is mapped twice. The first partition of 0.4 GB P0 of the 1 GHz SDDR3 memory is mapped interleaved with the 1 GB of 2.5 GHz GDDR5 memory in the second partition P1 930. The 1 GB of 1 GHz SDDR3 memory is then mapped a second time at a given offset of 8 GB for example. The software, for example, is then used to prevent the first 0.4 GB in the high memory space from being accessed since it aliases with the lower memory version. Thereafter, the mapping 645 may be used for reading the data or portions thereof from the SDDR3 and/or GDDR5 memory 630, 635.

At 830, one or more memory interfaces 620, 62 are used to access the locations in the corresponding memory devices 630, 635 of different memory types. In one implementation, the memory controller 615 dispatches the memory access requests to the given memory interfaces 620, 625 determined from the memory mapping table 645 as a function of one or more parameters, including the data rate of the different memory types.

Embodiments of the present technology may be readily extended to electronic devices having memory systems that include more than two different types of memory. For example, the memory accesses may be striped across three memories, until one or the memories runs out. The memory accesses may then be stripped over the other two memories, until a second memory runs out. Thereafter, the memory accesses may to the third memory device in a non-striped manner. In addition, embodiments of the present technology may be readily extended to electronic device having memory systems that include different types of memory that have non-integer ratios between the respective data rates.

The foregoing descriptions of specific embodiments of the present technology have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. A method comprising: determining one or more parameters, including a data access rate, of a plurality of different types of memory devices coupled to a computing device;
and configuring a memory mapping algorithm to balance traffic to two or more memory devices of different types together for a given memory access as a function of the one or more determined parameters including the data access rates of the two or more memory devices of different types and to stripe memory accesses for a first location in an address space across the two or more memory devices of different types in a ratio of the data access rate of the two or more memory devices of different types.

2. The method according to claim 1, further comprising configuring the memory mapping algorithm to dynamically access memories of one or more types as a function of one or more other determined parameters.

3. The method according to claim 1, further comprising:
determining one or more parameters of the computing device or load on the computing device; and
configuring the memory mapping algorithm to dynamically access memory of one or more types as a function of one or more determined parameters of the computing device or load on the computing device.

4. The method according to claim 1, further comprising:
organizing each memory device into one or more partitions as a function of the one or more determined parameters including the data rate of the memory devices;
and configuring the memory mapping algorithm to balance traffic to partitions in the two or more memory devices of two or more different types together for the given memory access as a function of the one or more determined parameters including the data rate of the memory devices.

5. The method according to claim 1, wherein the memory mapping is configured to access a leftover portion, after striping, of a first or second of the two or more memory devices, wherein the leftover portion of the first or second of the two or more memory devices is accessed, at a second location in the address space, as contiguous memory and not striped memory.

6. A method comprising: receiving a memory access request at a given physical address and a given length;
Determining locations in a plurality of memory devices for the given physical address and the given length from a mapping, wherein the mapping balances traffic between two or more memories of different memory types together for the memory access request as a function of one or more parameters including a data access rate of the different memory types and stripes memory accesses for a first location in an address space across the two or more memory devices of different types in a ratio of the data access rate, of the two or more memory device of different types;
And accessing the locations in the corresponding memory device.

7. The method according to claim 6, wherein the mapping further balances traffic between partitions in the two or more memories of different types together for the memory access request as a function of one or more parameters including a data rate of the different memory types.

8. The method according to claim 6, wherein the plurality of memory devices comprises a first set of memory devices operating at first data rate and a second set of memory devices operating at a second data rate.

9. The method according to claim 8, wherein the locations for write memory accesses are dynamically mapped to memories of one or more types as a function of one or more other parameters for another memory access request instead of balanced as a function of the data rate of the different memory types.

10. The method according to claim 9, wherein the one or more other parameters include a memory access traffic load parameter.

11. The method according to claim 9, wherein the one or more other parameters include a memory power consumption parameter.

12. A method comprising:
an initialization phase including:
determining one or more parameters, including a data rate, of a plurality of memory devices including memory devices of two or more different types coupled to a computing device; and configuring a memory mapping algorithm to balance traffic between memory devices of first and second types together for a give memory access as a function of the one or more determined parameters including the data rate of the memory devices of the first and second types and to stripe memory accesses across the memory devices of the first and second types in a ratio of the data rates of the first and second types; and an operating phase including:
receiving a memory access request at a given physical address and a given length;
determining location in one or more of the memory devices for the given physical address and the given length based on the memory mapping algorithm; and
accessing the locations in the one or more memory devices.

13. The method according to claim 12, wherein memory of the first type is characterized by a first data rate, and memory of the second type is characterized by a second data rate that is faster than the first data rate.

14. The method according to claim 13, wherein memory of the first type is characterized by a first storage capacity, and memory of the second type is characterized by a second storage capacity that is less than the first storage capacity.

15. The method according to claim 14, wherein memory of the first type is characterized by a first power rate, and memory of the second type is characterized by a second power rate that is greater than the first power rate.

16. The method according to claim 15, wherein memory of the first type is characterized by a first cost, and memory of the second type is characterized by a second cost that is greater than the first cost.

17. The method according to claim 12, wherein the configured memory mapping algorithm dynamically accesses memory of the first type if a memory access traffic load parameter is in a predetermined range, instead of balancing traffic between memory of the first and second types.

18. The method according to claim 12, wherein the configured memory mapping algorithm dynamically accesses memory of the first type if a power consumption parameter is in a predetermined range, instead of balancing traffic between memory of the first and second types.

* * * * *